July 4, 1967

G. KRAUS 3,328,963

ATTITUDE CONTROL DEVICE FOR SPACE VEHICLES

Filed Dec. 27, 1962

INVENTOR.
GEORGE KRAUS
BY Raymond P. Wallace

AGENT

July 4, 1967 G. KRAUS 3,328,963
ATTITUDE CONTROL DEVICE FOR SPACE VEHICLES
Filed Dec. 27, 1962 2 Sheets-Sheet 2

INVENTOR.
GEORGE KRAUS
BY Raymond P. Wallace
AGENT

United States Patent Office 3,328,963
Patented July 4, 1967

3,328,963
ATTITUDE CONTROL DEVICE FOR SPACE VEHICLES
George Kraus, Hillside, N.J., assignor to Curtiss-Wright Corporation, a corporation of Delaware
Filed Dec. 27, 1962, Ser. No. 247,672
6 Claims. (Cl. 60—250)

This invention relates to attitude control of space vehicles, that is, the orientation of the axes of a vehicle in inertial space, and more particularly to a method and apparatus for altering the position of the axes of a vehicle in space by the application of discrete increments of reaction force.

The need for attitude control of a spacecraft or missile may arise simply from the necessity to prevent tumbling or spinning, or it may arise from the orientation requirements of devices such as cameras, solar panels, directional antennas, navigational equipment, or other apparatus for sensing radiation. Attitude control may also be necessary to orient the main thrust vector preparatory to a maneuver.

To meet widely varying attitude control requirements the system must be capable of delivering large total impulses for gross changes in vehicle attitude (slewing operations), and very small total impulses for minor orientations. Previously, these requirements have not been generally compatible with a design utilizing a single thrust chamber. If the chamber is sized to meet the requirements of gross attitude changes, it is usually too large to serve for fine orientation, and conversely, if it is small it requires excessive time periods for large angular displacements.

Liquid fuel rocket engines attempt to satisfy such a dual requirement by sizing the engine for large displacement, and then depending on fast acting solenoid valves for small increments. However, when prolonged space missions are considered, liquid propellant introduces serious problems, such as the storability of the liquids over long periods, and the long-term compatibility of the liquids with their containers and pressurizing systems.

It has also been attempted to use solid fuel rocket engines having a single fuel body, sizing the engine for large angular displacement, and pulsing it intermittently to procure minute movements for limit cycle operation. This method encounters the difficulty of start-stop operation of a single fuel body in a solid propellant motor, and even when this can be done, it appears that the start and stop response time of solid propellant is not adequate. There is also the further difficulty that the thrust of a solid propellant engine burning a single fuel body varies with the area of exposed fuel surface during burning.

The present invention solves these problems by the use of discrete, minimum impulses from pellets of solid fuel which can be fired either singly or in rapid bursts of the necessary number to provide the required total thrust. This operation is accomplished by providing a plurality of small, lightweight, individual solid propellant rocket motors bonded to a tape or similar flexible member, each individual motor having its own firing chamber and exhaust nozzle. Within each firing chamber is encapsulated a precise, minute amount of propellant. A transport mechanism carrying the tape feeds each individual rocket engine to the firing position, where the propellant is fired in situ within its individual firing chamber, the exhaust gases being discharged through the individual nozzle of each engine to produce reaction thrust. The transport rate is variable, and the motors may be fired singly or in continuing bursts.

It is therefore a primary object of this invention to provide a means of orienting a vehicle in space.

It is another object of the invention to provide means adapted to fine or gross orientation of a space vehicle.

It is another object of the invention to orient a space vehicle by means of discrete reaction impulses.

A further object is to provide a concatenated series of individual rocket engines, each bearing a fuel charge integral therewith.

A still further object is to provide a transport and firing system for a concatenated series of rocket engines.

Other objects and advantages will become apparent on reading the following specification in connection with the acompanying drawings, in which.

Figure 1:
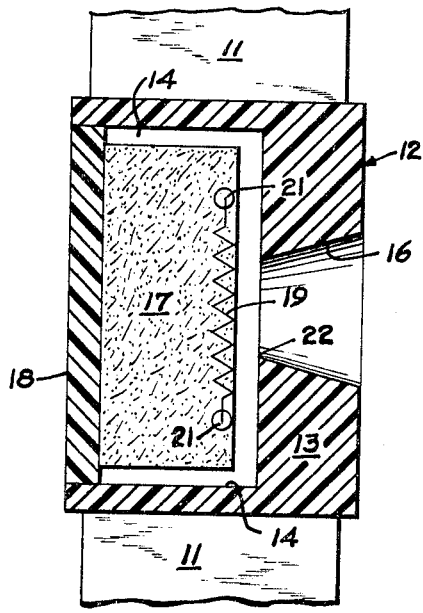
FIGURE 1 is a sectional view of one of the individual rocket engines, taken on line 1—1 of FIGURE 2.

Referring more particularly to FIGURE 1, there is shown a portion of a strip of flexible tape 11 having bonded thereto a reaction motor or rocket engine designated generally by the numeral 12. Any material of suitable strength and thickness may be used for the tape; particularly satisfactory materials are the polyethylene terephthalate resin sold under the trademark "Mylar," and a phenolic plastic material reinforced with glass fiber. The engine 12 comprises a housing 13 having an internal cavity 14 and a nozzle 16 communicating with the internal cavity. Positioned within the internal cavity 14 is a charge of solid fuel propellant 17, the rear of the cavity being closed by a plug 18 or other suitable closure means. An electrical igniter 19 is also positioned within the cavity in contact with the propellant. Electrical leads 21 are connected to the igniter to form a conducting path, and extend outwardly through the housing wall and through the tape to provide terminals exterior to the rocket engine. The igniter may be a simple resistance element as shown, or any other element capable of generating sufficient heat by electrical excitation to ignite the propellant material. Likewise, the electrical leads may extend through the housing or through the tape at any convenient point.

The body or housing 13 may be formed of any suitable material, such as metal or plastic; however, it should preferably be as light in weight as possible, consistent with the strength required. A particularly suitable material has been found to be glass-reinforced phenolic plastic, which is moldable, has high dimensional stability, sufficient strength to resist the pressures developed, high ablation resistance, and good long-term resistance to a space environment. The nozzle 16 may be of any suitable shape and proportions dictated by the design parameters for a given use. Ordinarily it will have a throat 22 as shown at the juncture with chamber 14, and will diverge outwardly in the downstream direction.

The propellant 17 may be of any suitable explosive material, the choice of which may vary widely according to desired burning characteristics, such as temperature of ignition, burning rate, and thrust or pressure developed. One particular composition which has been successfully used comprises a mixture of potassium perchlorate and rubber, which is moldable into pellets and possesses the necessary storage life in a space environment. The charge of propellant may entirely fill the combustion chamber, or may occupy any desired portion thereof. Ordinarily it is preferable to have a charge of somewhat less volume than the chamber, leaving the surface of the charge exposed on the side toward the exhaust nozzle, as shown in FIGURE 1.

Figure 2:
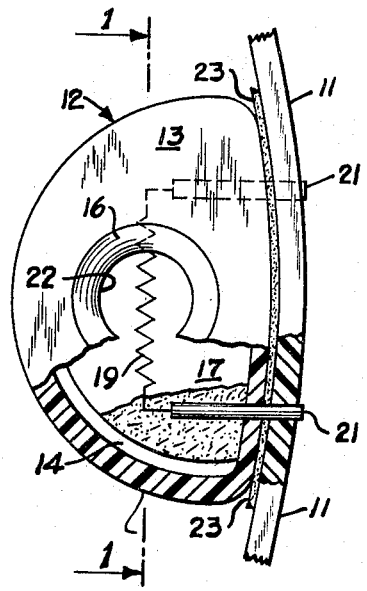
FIGURE 2 is a view of the nozzle end of one of the individual motors, partly in section.

Referring now to FIGURE 2, there is shown the nozzle end of one of the encapsulated rocket engines 12, bonded to the tape 11 with adhesive 23, the thickness of tape and adhesive being much exaggerated for clarity of illustration. Epoxy resin has been found suitable as an adhesive for this purpose. The housing 13 is shown as generally semi-cylindrical in shape, with the semi-round side opposite the tape, for the purpose of mating with the advancing mechanism later to be described. The semi-cylinder may have a flat side bonded to the tape, or the bonded side may also be slightly curved as shown for better fit with the external guide plate of the advancing mechanism. It will be obvious, however, that the housing is not limited to the curvatures and shape shown, but may have any form required by the particular mechanism to be used.

Figure 3:
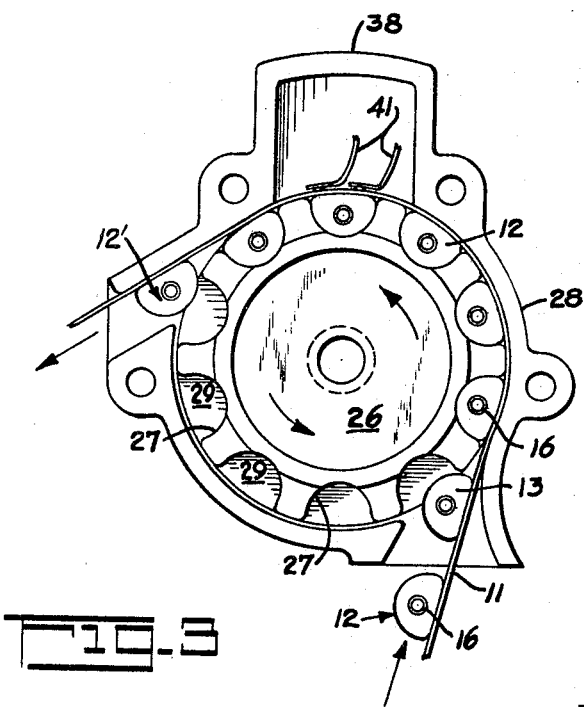
FIGURE 3 is a plan view of the tape-feeding mechanism.

FIGURE 3 shows in semi-schematic fashion the sprocket wheel 26 of the advancing mechanism, and the external guide plate 28 against which the tape is retained during its progress through the advancing and firing mechanism. The sprocket wheel 26 is rotated in the direction shown by the arrow, in 36° increments, pulling the tape 11 bearing the concatenated series of reaction engines from the storage magazine. The engine housings are of proper size and shape to fit and engage with recesses 27 of the sprocket wheel, and are so spaced along the tape as to mate with the spacing of the recesses. As the housings enter the recesses, the tape is held in close contiguity to the perimeter of the sprocket wheel by guide plate 28 surrounding a portion of the wheel.

The sprocket wheel is powered by a stepper motor (shown in FIGURE 4) in discrete pulses which advance the rocket engines one position at each pulse, to the firing position, shown at the top of FIGURE 3. At the firing position the electrical leads 21 of the igniter 19 make contact with leads 41 from an electrical power supply (not shown) and are energized on command triggered by the collapse of the magnetic field in the coils of the motor after each pulse signal. Thus the encapsulated charge cannot be fired in motion, or at any other location than the proper firing position, since the firing circuit can be activated only by a reverse inductive surge from the coils of the advancing mechanism.

Figure 4:
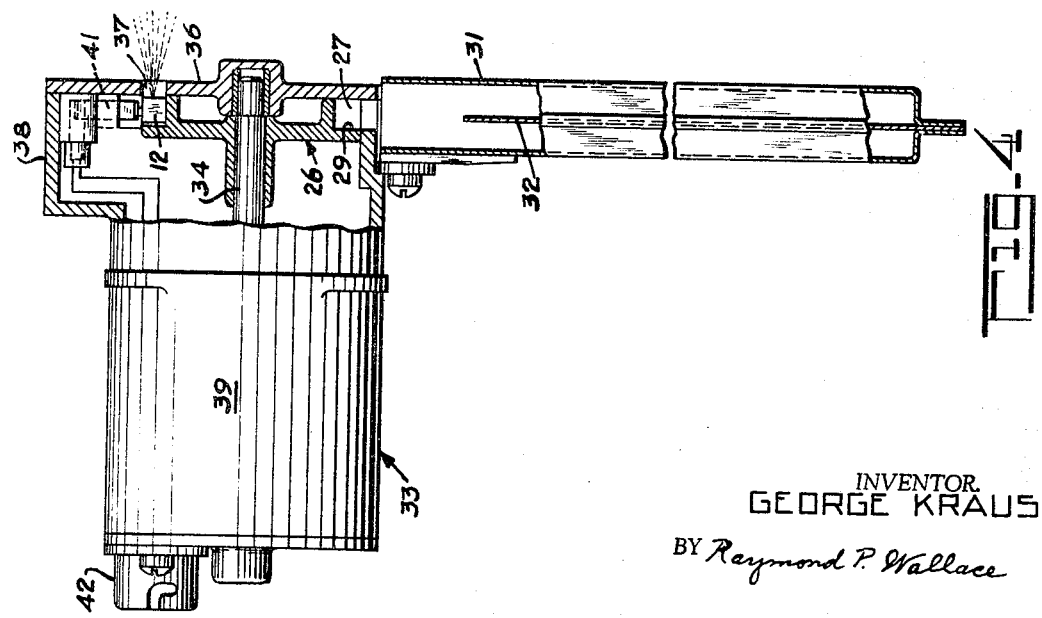
FIGURE 4 is a side view, partially broken away, of the tape magazine, advancing mechanism, and firing mechanism.

The plastic housings are sufficiently strong to withstand the pressure developed during firing, but in addition they are closely restrained around their peripheries by the recesses 27 and the guide plate 28. The thrust is parallel to the axis of the sprocket wheel, and is taken up by the portions 29 of the wheel at the bottom of the recesses 27, as shown in FIGURES 3 and 4. Thus, at the time of firing, the rocket engines are wholly restrained and supported except at the nozzle end. The tape bearing the fired engines 12' exits from the advancing mechanism as shown in FIGURE 3, and in a space environment is allowed to float free.

In FIGURE 4 there is shown a side elevation of the attitude control device, with the tape magazine 31 and the advancing mechanism in cross section. The magazine 31 may be any convenient container for the concatenated rocket engines, and is shown as a rectangular plastic box adapted to hold a pleated tape of the desired length and communicating with the advancing mechanism. The magazine may have one or more internal partitions 32, providing for a plurality of layers of pleated continuous tape.

A stepper motor 33 of conventional type is provided for driving the sprocket wheel in the selected angular increments. The output shaft 34 of the motor has mounted thereon and rotatable therewith the sprocket wheel 26, the free end of the output shaft being journalled in a removable cover plate 36. One of the encapsulated rocket engines 12 is shown in the firing position, the cover plate 36 being provided with an aperture 37 disposed directly over the engine, whereby the exhaust of the engine may be discharged through the aperture. An extension 38 of the stepper motor housing 39 and adjacent to the firing position contains electrical leads 41 so positioned as to make contact with leads 21 of each individual rocket engine at the firing position, whereby the rocket engines are fired by a signal generated by the collapse of the magnetic field of the stepper motor coils after each advance. A connector 42 of conventional type extends from the stepper motor housing to provide for the introduction of the necessary elecrical leads to the motor.

Figure 5:
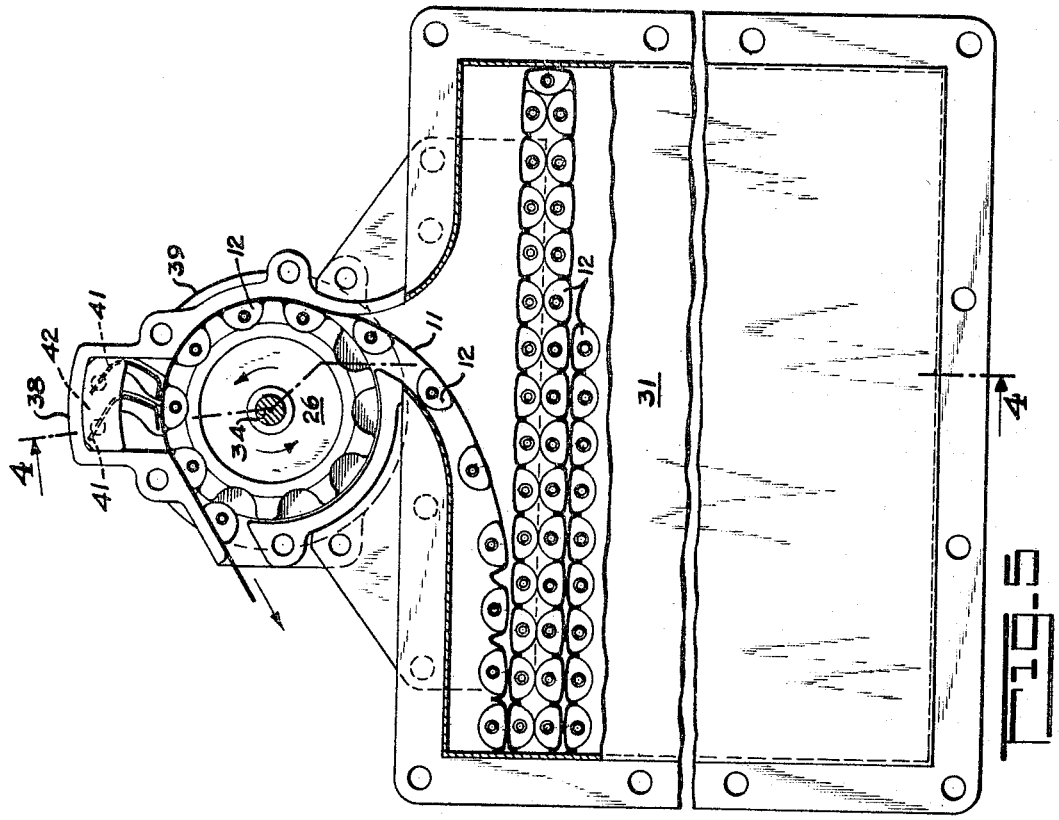
FIGURE 5 is a plan view of the device of FIGURE 4 with the cover plate removed.

FIGURE 5 shows a plan view of the attitude control device of FIGURE 4, with cover plate 36 removed. There is also shown the communication of the magazine with the advancing mechanism, with a convenient manner of pleating the tape into the magazine. It will be understood that the magazine need not have the particular rectangular shape shown, but may have other proportions, or may be curved or of any other form allowing the tape to run freely therefrom.

Although for convenience the attitude control device has been described primarily with reference to using pellets of solid fuel as the charges of the encapsulated propellant, the invention is not limited to the use of solid fuel. For instance, instead of a solid the individual rocket engines may contain a monopropellant liquid, with the firing chamber sealed off from the nozzle throat by a membrane, with the igniter so positioned that upon energization it will rupture the sealing membrane as well as igniting the monopropellant.

Control devices of the type described may be mounted on the periphery of a space vehicle, preferably at either the nose or the stern, for controlling the attitude of the vehicle. If four such devices are disposed ninety degrees apart and adapted to discharge radially with respect to the longitudinal axis of the vehicle, it will be apparent that the longitudinal axis may be oriented in space in any desired direction. With an additional pair of control devices adapted to discharge tangentially with opposing forces, rotation in either direction about the longitudinal axis can be imparted to the vehicle.

Although the invention has been described above in a preferred embodiment, it will be understood that various modifications may be made by those skilled in the art without departing from the principle of the invention. It is intended to cover all such modifications by the appended claims.

What is claimed is:
1. A pulse rocket system comprising,
   (a) rocket motor receiving means including a first wall and a second wall spaced from said first wall and an orifice through said first wall,
   (b) a series of individual rocket motors, each of said motors comprising a casing enclosing a combustion chamber and having an exhaust nozzle therethrough, said casing being constructed to withstand the temperature and pressure generated during operation of said motor, a charge of propellant within said combustion chamber and electrical conduction means for effecting a passage of ignition current within said motor,
   (c) means for supporting the individual rocket motors, the support means including a continuous belt on one side of which said motors are individually supported in series relationship,
   (d) means for sequentially positioning each of said motors in an ignition position in the space between said first wall and said second wall such that said exhaust nozzle and said orifice are in direct flow communication, and
   (e) ignition means for igniting each of said motors when each of said motors is in said ignition position, said second wall comprising a rotary member rotatable in a plane parallel with said first wall, said rotary member being at least partially surrounded by an arcuate third wall normal to said first and second walls, said motors being sequentially received in the space defined by said first, second, and third walls.

2. A pulse rocket system as recited in claim 1, wherein said sequential positioning means includes a rotary electrical stepper motor intermittently rotatable in discrete angular increments of rotation and having an output shaft, said rotary member being mounted on said output shaft, said stepper motor having means alternately generating and collapsing a magnetic field at each rotational impulse, said ignition means being intermittently energized at each collapse of said magnetic field to initiate combustion in said propellant.

3. A pulse rocket system as recited in claim 2, wherein said rotary member has rocket motor receiving means comprising sprockets, said sprockets having angular spacing matching said angular increments of rotation, the longitudinal spacing of said rocket motors on said belt matching the spacing of said sprockets, said rocket motors having a profile congruent with the shape of the space between sprockets, said sprockets engaging said rocket motors and drawing said rocket motors sequentially between said first and second walls with said belt adjacent and parallel to said arcuate third wall to said ignition position.

4. A pulse rocket system as recited in claim 3, wherein said electrical conduction means of each of said rocket motors extends through said belt, and said ignition means is mounted on said arcuate wall and disposed at said ignition position such as to make sequential contact with said conduction means.

5. A rocket motor for attitude control of space vehicles, comprising in combination a housing having a generally semicylindrical first wall, an arcuate second wall having a larger radius of curvature than said first wall and subtending said first wall and having its convex surface outwardly disposed, and a pair of parallel end walls, said first and second walls and end walls defining a combustion chamber in said housing; one of said end walls having an exhaust nozzle therethrough; a charge of propellant in said housing; electrical resistance means in contact with said propellant; and a pair of electrical leads connected to said resistance means to form an electrical conducting path therewith, said leads extending through said arcuate second wall.

6. A concatenated series of individual rocket motors, comprising in combination a flexible belt member bearing a plurality of rocket motors mounted on one side thereof and equidistantly spaced therealong; each of said rocket motors comprising a housing having a generally semicylindrical first wall, an arcuate second wall having a larger radius of curvature than said first wall and subtending said first wall and having its convex surface mounted on said belt, and a pair of parallel end walls, said first and second and end walls defining a combustion chamber in said housing; one of said end walls having an exhaust nozzle therethrough; a charge of propellant in said housing; electrical resistance means in contact with said propellant; and a pair of electrical leads connected to said resistance means to form an electrical conducting path, said leads extending through said arcuate second wall and through said belt.

References Cited

UNITED STATES PATENTS

| 1,103,503 | 7/1914 | Goddard. | |
|---|---|---|---|
| 1,191,299 | 7/1916 | Goddard. | |
| 1,194,496 | 8/1916 | Goddard. | |
| 1,273,078 | 7/1918 | McManns | 89—35 |
| 1,468,822 | 9/1923 | Ludorf | 42—84 |
| 2,129,875 | 9/1938 | Rost. | |
| 2,172,163 | 9/1939 | Glowka | 60—35.6 |
| 2,317,579 | 4/1943 | Bacon | 42—39.5 |
| 2,403,730 | 7/1946 | MacNeille | 60—26.11 X |
| 2,561,255 | 7/1951 | White et al. | 89—33.5 |
| 3,075,433 | 1/1963 | Stockholm | 42—84 |
| 3,210,931 | 10/1965 | Elzufon et al. | 60—35.6 |

FOREIGN PATENTS 969,930   5/1950   France.

CARLTON R. CROYLE, *Primary Examiner.*

MARK NEWMAN, *Examiner.*